April 25, 1950 S. T. FISHER 2,504,971

MEANS FOR SUPPRESSION OF NOISE
IN COMMUNICATION SYSTEMS

Filed Nov. 8, 1946 3 Sheets-Sheet 1

Inventor:
Sidney T. Fisher
By Richard C. Lindley
Attorney

April 25, 1950 S. T. FISHER 2,504,971

MEANS FOR SUPPRESSION OF NOISE IN COMMUNICATION SYSTEMS

Filed Nov. 8, 1946 3 Sheets-Sheet 2

Inventor:
Sidney T. Fisher
By Richard C. Lindberg
Attorney

April 25, 1950

S. T. FISHER
MEANS FOR SUPPRESSION OF NOISE
IN COMMUNICATION SYSTEMS 2,504,971

Filed Nov. 8, 1946

3 Sheets-Sheet 3

Inventor:
Sidney T. Fisher
By Richard C. Lindberg
Attorney

Patented Apr. 25, 1950 2,504,971

UNITED STATES PATENT OFFICE 2,504,971

MEANS FOR SUPPRESSION OF NOISE IN COMMUNICATION SYSTEMS

Sidney T. Fisher, Montreal, Quebec, Canada, assignor to Federal Telephone and Radio Corporation, New York, N. Y., a corporation of Delaware Application November 8, 1946, Serial No. 708,569
In Canada March 16, 1943

1 Claim. (Cl. 179—1)

This invention relates to a method of controlling and diminishing undesired extraneous noises and sounds that may be impressed on the microphone of a communication system during such time as the transmission of speech is being made over and by means of such transmission system.

Volume expansion, I have discovered, is an effective and novel method whereby most undesired sounds and noises can be reduced and substantially eliminated while the spoken word is transmitted in a clear manner.

One object of the invention is to permit an improvement in the radio reception of voice sounds which emanate from sources or points where other sounds and noises are much in evidence. Such sources include the interior of military tanks in operation, locomotive cabs and the interior of airplanes during flight. This novel system of volume expansion will also improve radio reception when the transmitted programmes originate in the vicinity of operating machinery or at any place or location where work is in progress, such work generating noises and sounds which may be considered to be detrimental to the normal transmission of voice or music over radio transmitting systems.

The operating basis of the novel application of volume expansion depends upon the established fact that sound waves arising from the operation of machinery and mechanical devices, the rush of wind and the escape of steam are characterized by having a relatively constant value and by possessing a peak value somewhat below the peak value of normal speech level.

Consideration and control of these two sound levels form the basis of the invention. This control is brought about by means of a novel transmission circuit.

All of the above noted desirable features and results and others which will hereinafter be apparent are accomplished by means of the novel arrangement of circuits and apparatus diagrammatically illustrated in the accompanying drawings, forming a part of this specification, and showing by way of example a typical embodiment of the invention.

Referring to the drawings.

Figure 1:
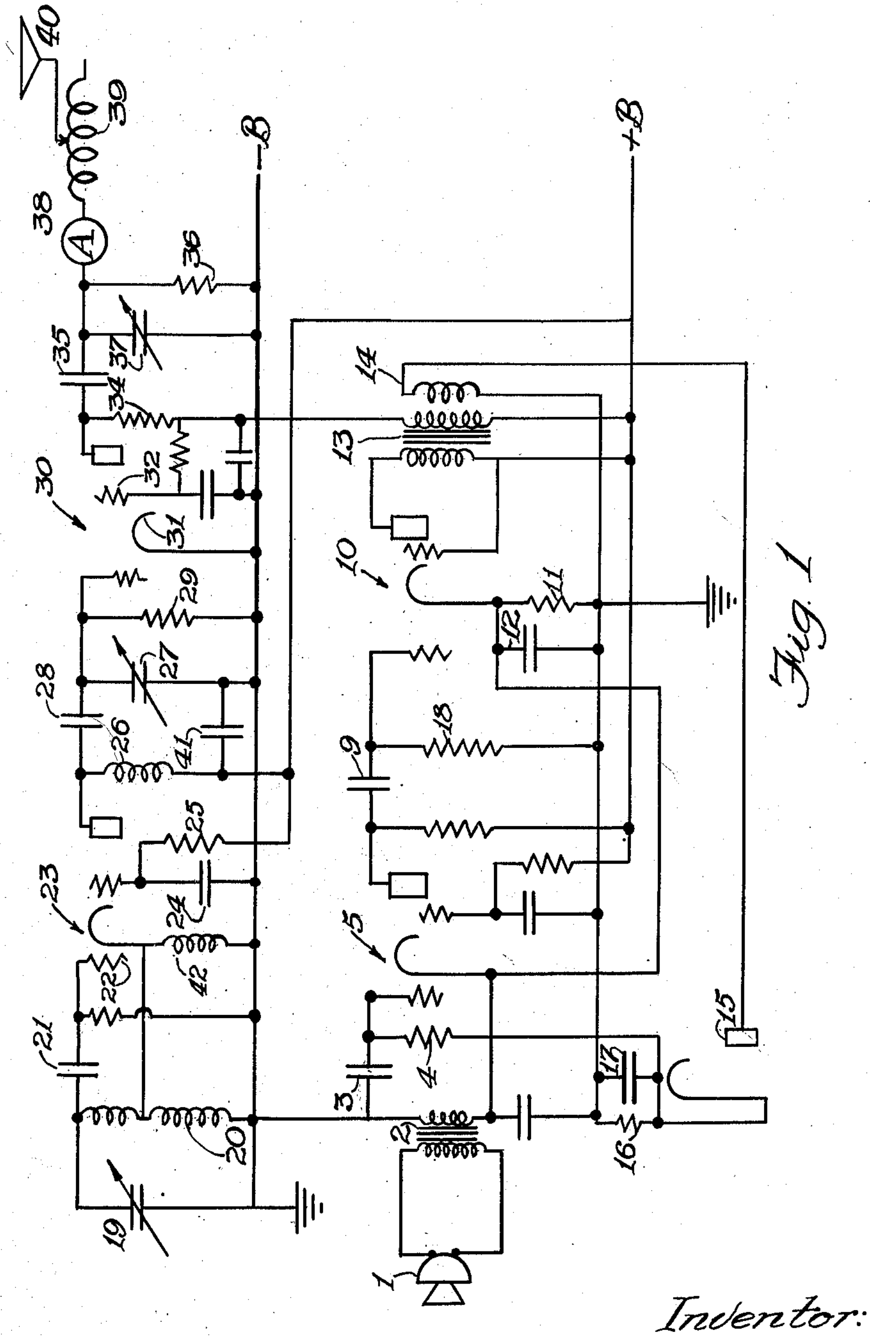
Fig. 1 illustrates diagrammatically the circuits and apparatus of a transmitter equipped to carry out the invention.
Figure 2:
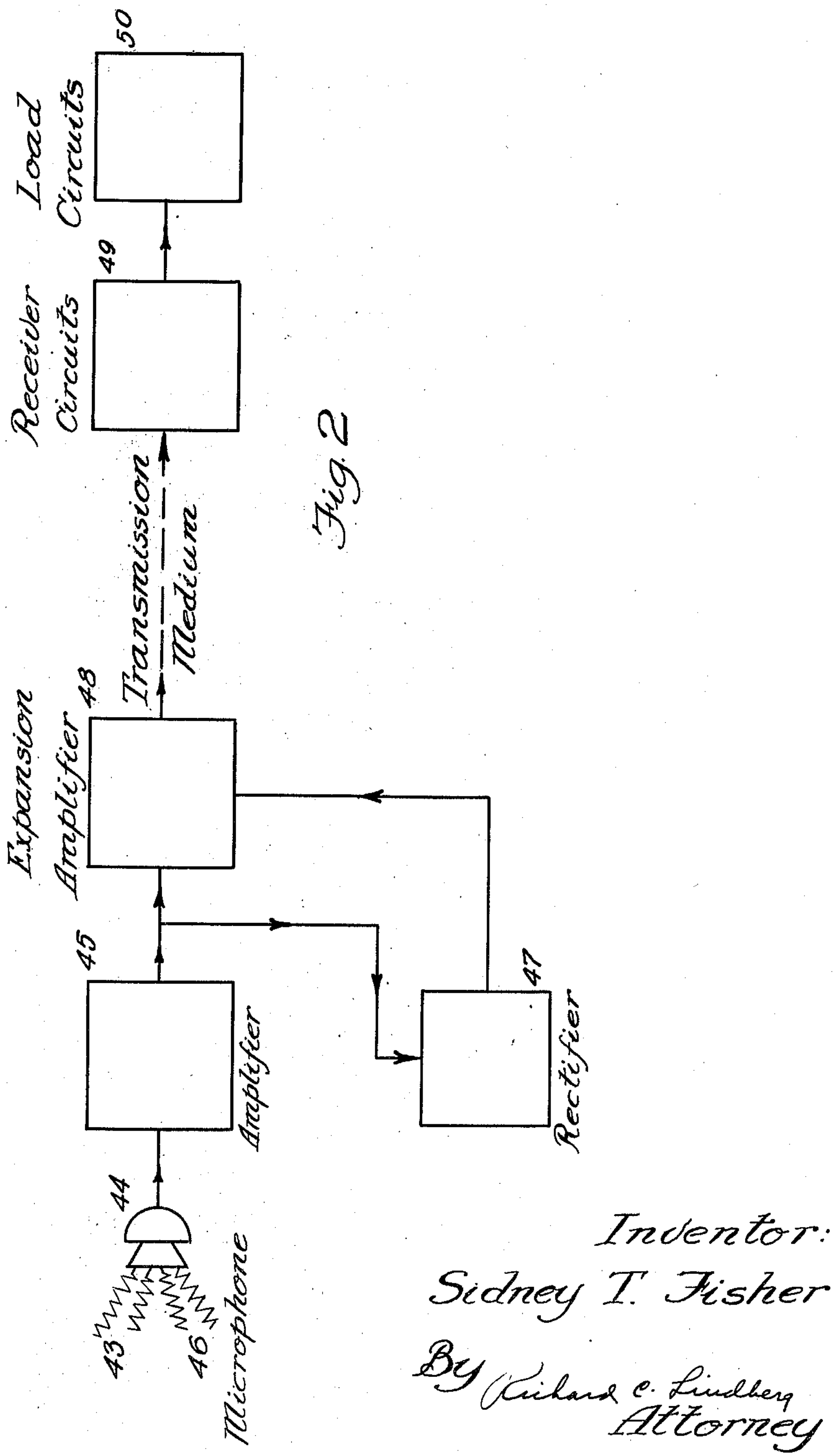
Fig. 2 illustrates in block diagram the arrangement, relation and connections of the various units of the invention at a transmitting and receiving station.
Figure 3:
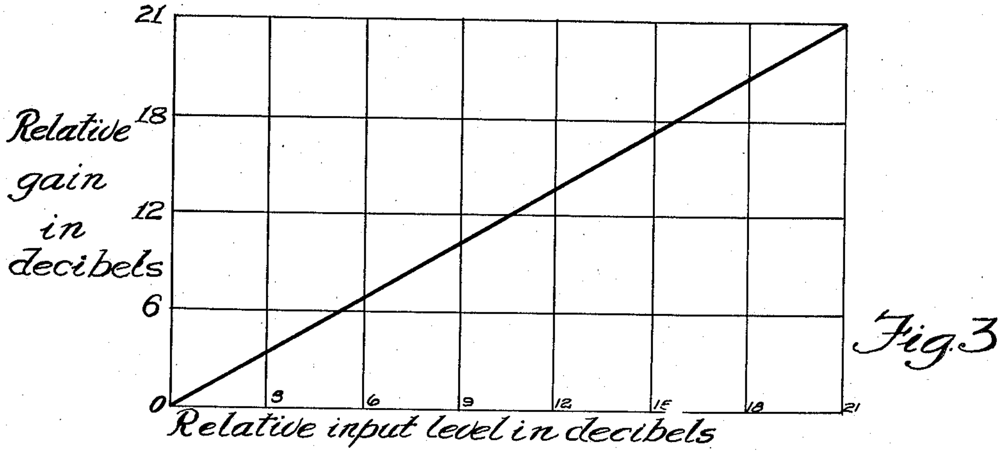
Fig. 3 shows the gain-input level curve of the expansion amplifier.

Fig. 2 is a simple presentation of the main features of the invention and it would perhaps contribute to a better understanding of the invention to consider this figure and Fig. 3 before explaining in detail the circuit diagram of Fig. 1. In this drawing 43 represents voice sound waves being impressed on a microphone 44. During such impression of 43 on 44 a different set of sound waves 46 are also being impressed on the microphone 44. It is to be understood, for purposes of this description, that the sound waves 46 are of an extraneous nature and are not desired in the transmission of the speech sound waves 43.

The electrical impulses, set up by this dual set of sound waves, pass from the microphone 44 to an amplifier 45. The output of the amplifier enters an expansion amplifier 48 by two channels.

A portion of the amplifier output from 45 goes, by means of the circuit shown, to a rectifier 47 and thence to the expansion amplifier 48. The balance of the output from 45 goes directly to the expansion amplifier 48.

From the expansion amplifier 48 the impulses are fed to an antenna and the ground and by means of the usual transmission medium reach a receiver 49 and load circuits as shown at 50.

By use of this circuit it is found that the resultant voltage coming from the rectifier 47 is free from speech components and varies only at the syllabic frequency of the speech. This voltage output is used to control the gain of the expansion amplifier 48.

Fig. 3 shows the gain-input level curve of a typical expansion amplifier. From this curve it will be seen that the gain increases with the input level.

Fig. 1 shows the embodiment of the invention in a typical radio telephone transmitter. A microphone 1 is understood to be located at a point where undesired noises are of a volume sufficient to interfere with the normal transmission of speech sounds. As shown, the microphone 1 is coupled to an input transformer 2, the secondary of which leads to an expansion amplifier stage 5 through a capacitor 3 across a grid resistor 4.

Amplifier stage 5 is capacity-resistance coupled to an amplifier stage 10 by means of a capacitor 9 and a grid resistor 18. The amplifier tube 10 has a cathode resistor 11 and a cathode by-pass capacitor 12, by means of which the cathode of tube 5 is maintained at a substantially constant positive potential with respect to the ground.

An output transformer for the second amplifier tube 10 is indicated at 13. This transformer has an extra secondary winding 14, the voltage from which winding is delivered to a load resistor 16 and an audio-frequency by-pass capacitor 17. The positive bias generated across resistor 16 is used to supply grid bias to the expansion amplifier 5.

The main portion of the power output from tube 10 is used to plate modulate a class C, radio-frequency amplifier tube 30 which is coupled by reactances 34, 35, 36 and 37 to an antenna 40. An adjustable reactance 39 is connected through a radio-frequency ammeter designated by 38. Tube 30 is supplied carrier energy from a master oscillator tube 23, with an oscillating circuit made up from a variable reactance 19, and a split inductor 20. There are also two screen by-pass capacitors indicated by 21 and 24.

The coupling circuit to the tube 10 is formed by a radio-frequency choke 26, a variable condenser 27, two by-pass capacitors 28 and 41, and a grid return resistor 29.

The master oscillator tube filament 23 is connected to the ground through a radio-frequency choke 42.

Figure 4:
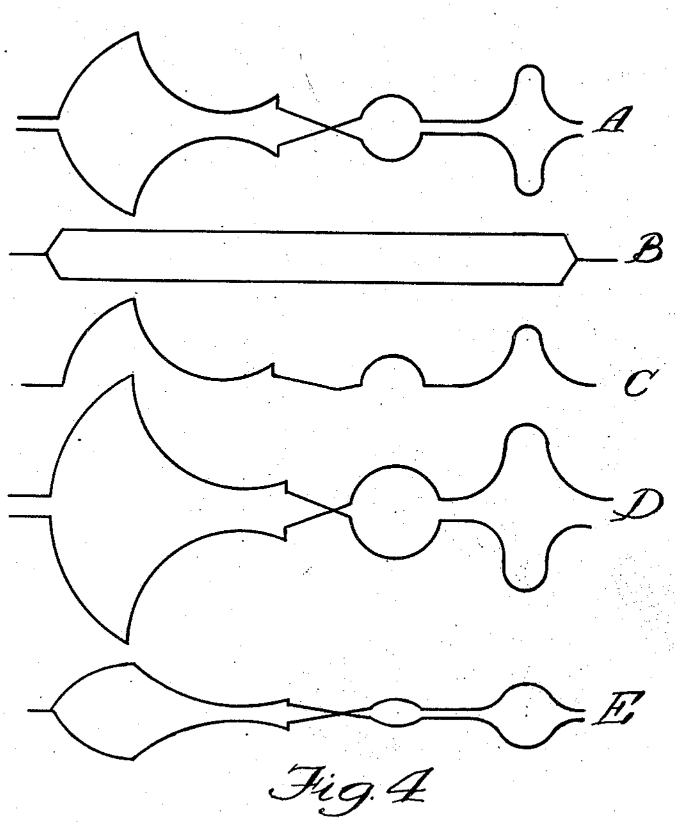
Fig. 4 shows the characteristic envelope curves for the noise and signal sounds as received by the microphone and as received by the receiver.

In Fig. 4 are shown characteristic envelopes for sounds as received by the microphone 1; and as received by the receiver circuit 8 in Fig. 1.

A in Fig. 4 represents the envelope of the speech wave and B represents the envelope of the noise wave. The ratio of these two waves is the signal to noise ratio. It is seen to be poor during periods of low speech level.

Curve C shows the variation in amplifier gain brought about by the speech wave. D represents the speech wave at the output of the amplifier. E represents the noise wave at the output of the amplifier.

The ratio of A to E is the signal to noise ratio at the output of the amplifier. A comparison of these sound envelope curves will indicate the manner in which the undesired noises and sounds are modified by the invention.

From the foregoing it will be apparent that the invention will improve the transmission and reception of voice signals in radio transmission, under all conditions wherein the voice signal originates from sources subject to undesired noises and sounds and that the novel method of so improving such transmission of voice signals is brought about by passing the combined signal and noise waves through a section of the circuit of which the transmission efficiency increases with the signal and noise combined level.

While the invention has been described in terms of a preferable embodiment thereof, it is not to be limited in terms of the embodiment disclosed, but only in terms of the claim here appended.

A noise suppression system comprising a pick-up influenced by both signal and noise energy, a volume expansion amplifier, a thermonic amplifier, an amplifier biased to cut-off, said amplifiers being connected in series in the order named and to said pick-up, and means including a rectifier connected between the output of said thermionic amplifier and a grid of said volume expansion amplifier for increasing the gain thereof with increased energy, and means whereby said amplifier is biased to cut-off passing energy only when there is signal energy superimposed on the noise energy.

SIDNEY T. FISHER.

REFERENCES CITED

The following references are of record in the file of this patent:

UNITED STATES PATENTS

| Number | Name | Date |
|---|---|---|
| 1,356,403 | Pridham | Oct. 19, 1920 |
| 2,155,807 | Stimson | Apr. 25, 1939 |